Patented July 28, 1936

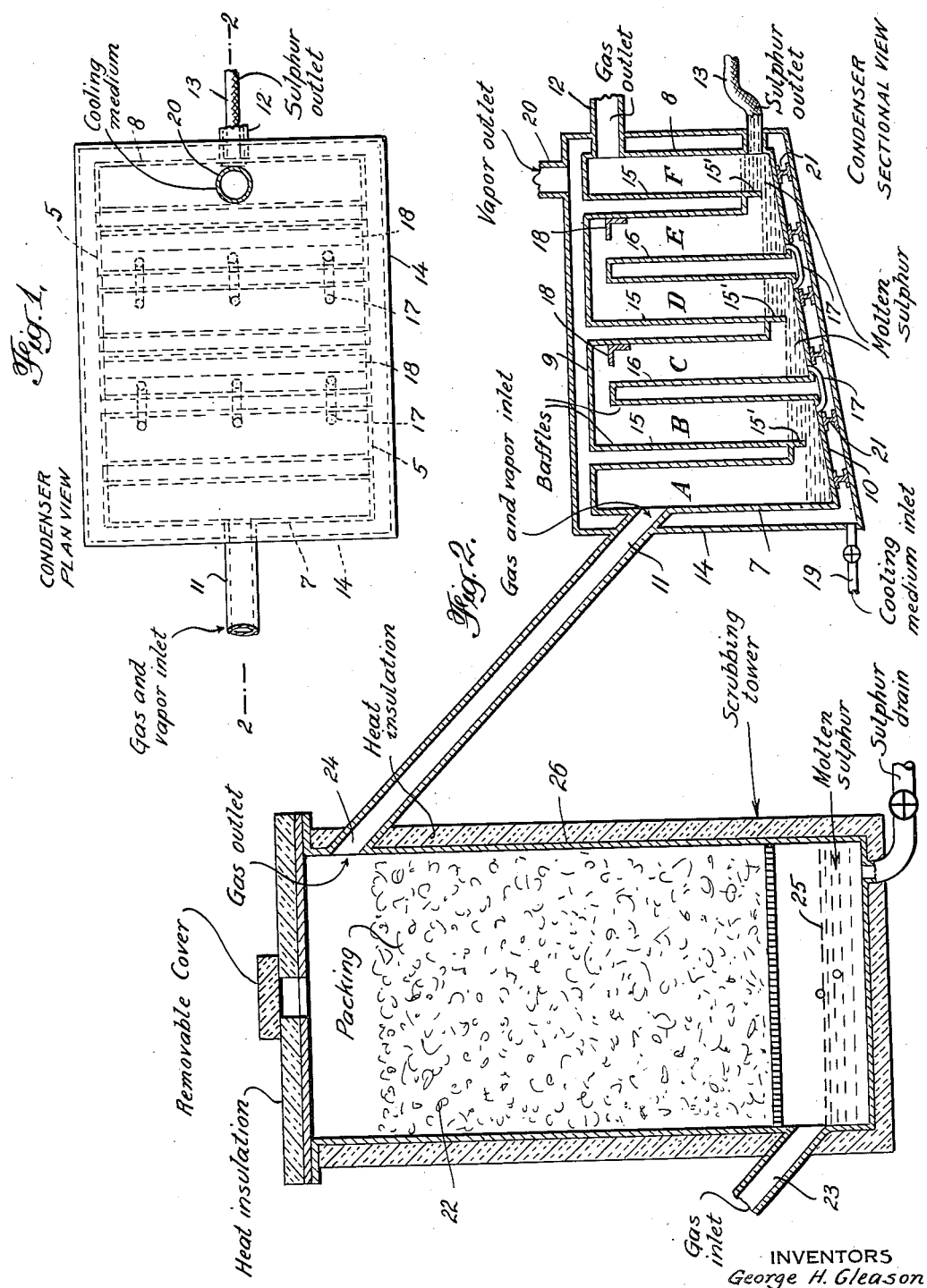

2,049,160

UNITED STATES PATENT OFFICE 2,049,160

SULPHUR CONDENSER

George Homer Gleason, Montclair, N. J., and Alfred C. Loonam, Brooklyn, N. Y., assignors to Guggenheim Brothers, New York, N. Y., a copartnership Original application March 31, 1932, Serial No. 602,237. Divided and this application September 6, 1934, Serial No. 742,912

10 Claims. (Cl. 23—263)

This invention relates to the recovery of sulphur and has for its object the provision of improved apparatus for recovering elemental sulphur from sulphur-bearing gases.

This application is a division of our application Serial No. 602,237, filed March 31, 1932 (Patent No. 1,972,884).

It has long been known that sulphur can be obtained from gases containing sulphur dioxide by treatment at an elevated temperature with a reducing agent, for example, in accordance with the following reactions when carbon is employed as the reducing agent:

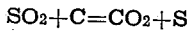
$$SO_2+C=CO_2+S$$

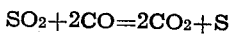
$$SO_2+2CO=2CO_2+S$$

However, no entirely satisfactory or successful commercial process utilizing these reactions has heretofore been developed, partly because of the difficulty of recovering the sulphur in a form which can be handled easily and cheaply. Most of the processes heretofore proposed either do not specifically state how the sulphur is to be recovered or assume its collection in a finely divided form, a procedure which not only presents all of the difficulty and expense of separating finely divided solids from gases but yields a product which is not easily handled.

The most convenient form in which to recover sulphur is as a liquid. This has presented certain difficulties, however, for the following reasons:

(1) Sulphur vapor at temperatures below its normal boiling point polymerizes to $S_6$ and $S_8$, thereby greatly lowering its partial pressure even in a comparatively rich gas.

(2) Liquid sulphur, in the temperature range between 160° and 225° C., is extremely viscous, so much so, in fact, that at 190° C. a vessel containing it can be inverted without the sulphur running out. While it is fluid above this temperature range, its vapor pressure is comparatively high and it is spontaneously inflammable.

(3) The very low thermal conductivity of sulphur itself.

The most favorable temperatures for condensing sulphur are, therefore, in the lower fluid temperature range of 114° to 150° C. To secure collection of the condensed sulphur in this temperature range, the sulphur vapor (or gases containing sulphur vapor) must be cooled rapidly to below 150° C., and the resulting cooled vapor or droplets of sulphur appropriately collected. The former condition may be obtained by providing suitable arrangements and conditions for efficient heat transfer and the latter by bringing the gases in contact with a powerful solvent for sulphur.

In accordance with our present invention, the first condition is attained by providing means for bringing the gases into contact with efficiently cooled surfaces of large area, thereby obtaining rapid cooling of the gases below the viscous temperature range of liquid sulphur. The second condition is attained by providing means for bubbling the resulting sulphur-bearing gases through liquid sulphur maintained at a temperature in the lower fluid range.

We have found that the practical attainment of these conditions is conveniently accomplished by surrounding the condensing chamber with a liquid having a boiling point within the lower fluid sulphur temperature range, thereby securing rapid dissipation of heat on one side of the chamber walls. Monochlorobenzene (the boiling point of which is about 132° C.), or water under a pressure of 10 to 30 pounds per square inch are appropriate liquids for the purpose.

We have found it desirable to construct the sulphur condenser so that the gases bubble through liquid sulphur one or more times, thereby insuring intimate contact between gas and liquid and preventing the formation of an insulating gas film on the surface of the liquid. The depth of liquid through which the gas passes need not be very great, 4½ inches being ample, and several passes through shallow layers are to be preferred to one pass through a greater depth. Following this procedure, we have found it practicable to collect over 94% of the sulphur content of a gas mixture containing only 6.5% sulphur by volume as $(S_8)$.

When the sulphur-bearing gases contain deleterious contaminants which might separate out with and contaminate the sulphur product, we prefer to subject the gaseous product to a preparatory cleansing treatment by passing it in contact with molten sulphur at an elevated temperature. The apparatus of the invention comprises means for carrying out such a preparatory treatment if desired. The condenser of the invention may be employed alone or in conjunction with such cleansing means.

The accompanying drawing illustrates, somewhat diagrammatically, apparatus embodying the principles of our invention. In this drawing, Fig. 1 is a top plan view of a condenser embodying the invention, and Fig. 2 is a sectional elevation on the section line 2—2 of Fig. 1, and showing in addition, a cleansing or washing tower in sectional elevation.

The condenser is made of good heat conducting material, such, for example, as sheet steel. The condensing chamber is formed of vertical side walls 5, vertical end walls 7 and 8, a horizontal top 9 and an inclined bottom 10. The gas inlet 11 is through the end wall 7, where the inclined bottom 10 is lowered, and the gas outlet 12 and the molten sulphur outlet 13 are through the end wall 8, where the inclined bottom 10 is highest. The condensing chamber is surrounded by a casing 14, of sheet steel or the like, suitably spaced therefrom to provide an appropriate jacket for the heat dissipating medium.

Transverse and vertically disposed hollow partitions or baffles 15 depend from the top 9 of the condensing chamber to within a short distance of the inclined bottom 10. Between the baffles 15 are transverse and vertically disposed hollow baffles or partitions 16 extending from the inclined bottom 10 to within a short distance of the top 9. The hollow interiors of the baffles 15 and 16 communicate with the jacket formed between the condenser walls and the casing 14. It is our preferred practice to extend one wall of the hollow partitions 15 a short distance below the jacketed or hollow part of the partition to form a lower barrier 15'.

Pipes 17, or other appropriate channels, provide communication for molten sulphur from one side to the other of the partitions 16. One or more of the partitions 15, near the discharge end of the condensing chamber, are provided near their upper ends, on the gas entering side, with transverse baffles 18 to knock down large globules of condensed sulphur entrained with the gases. The height of the discharge end of the molten sulphur outlet 13 is preferably adjustable in order to appropriately control the level of the molten sulphur on the bottom of the condenser. An inlet 19 is provided for the admission of the cooling or heat dissipating liquid medium to the jacketed portions of the condenser, and the top of the casing 14 has an opening 20 for the escape of vapor. The condensing chamber proper is supported on the bottom of the casing 14 by I-beams 21, or other appropriate form of support.

In operation, the gases containing sulphur vapor enter the condenser through the pipe 11 and flow downwardly into contact with the molten sulphur on the inclined bottom 10. The gases then pass under the first barrier 15' and bubble through the layer of molten sulphur in the bottom of the next chamber B. Flowing upwardly through the chamber B and downwardly through the chamber C, the gases again bubble through molten sulphur at the bottom of the chamber D. And again the gases bubble through molten sulphur in passing from the chamber E to the chamber F.

The molten sulphur is maintained at its proper levels in the various chambers by the gas pressure and by the positions of the barriers 15' and the height of the discharge end of the molten sulphur outlet pipe 13.

The cooling or heat dissipating medium, having a boiling point between 114° and 150° C. fills the jacketed portions of the condenser. The vapor of this medium, formed in the course of the condensation of the sulphur, passes out through the outlet 20 and may be either condensed and returned or used for supplying heat or for any other suitable purpose.

As a preparatory step to the condensation of the sulphur vapor, it is our preferred practice to pass the gaseous product containing the sulphur vapor in contact with molten sulphur at a temperature between 450° C. and 250° C., as described in our copending application Serial No. 602,238, filed March 31, 1932 (Patent No. 1,972,885). Gaseous products containing sulphur vapor may also contain materials which, if allowed to pass to the condenser, would separate out with and contaminate the sulphur product. These contaminants vary with the source of the gaseous product and may be present in the solid, liquid or vapor state. For example, the gaseous product from the reduction of sulphur dioxide by hot carbonaceous material may contain volatile tarry matters and solid particles of reducing agent. The contemplated treatment of the gaseous product with molten sulphur, which is in the nature of a washing or scrubbing action, removes such contaminants. The treatment may be advantageously carried out in a tower 26 of suitable proportions, made of steel (suitably insulated) and filled with a packing 22, such as coke, Raschig rings, "Chemico" rings, or the like, to provide a large gas contact surface over which liquid sulphur flows. The gas inlet 23 is at the bottom and the gas outlet 24 at the top of the tower. The sulphur used for washing may be introduced at the top of the tower as a spray or in fine streams, or the incoming gases may be brought in contact with liquid sulphur in a reservoir 25 at the bottom of the tower at a temperature high enough to permit them to entrain an adequate amount of sulphur vapor, which vapor is allowed to condense and return to the reservoir by causing the temperature to decrease as the gases proceed upward toward the outlet. By the latter procedure, we cool the gases, obviate the necessity for a circulating pump, bring comparatively clean sulphur into contact with the gases, and secure the benefits of the fact that even fine particles or droplets in suspension act as condensation centers and may be so laden with liquid sulphur that they settle out.

While it is desirable that the exit gases be at such a temperature that they contain the same amount of sulphur as the incoming gases thereby maintaining a constant amount of sulphur in the washer, actual conditions of operations may make this impracticable. In such cases, the amount of liquid sulphur in the washer will change and it will be necessary to add or bleed off sulphur from time to time.

The incoming gases may be bubbled through the liquid sulphur to insure intimate contact. If the incoming gases do not contain enough heat, it may be necessary to supply external heat principally at the bottom to secure circulation of sulphur. Part of the circulating sulphur is drawn off from time to time as the amount and nature of the collected contaminants may warrant and is replaced by clean sulphur. In actual practice, we have found that very satisfactory purification is obtained with an incoming temperature of the gases such that the temperature of the reservoir of liquid sulphur at the bottom of the washer is from 350° C. to 450° C., and the washer is so designed and operated that the gases exit at its top at a temperature approximately 100° C. lower.

The following example illustrates the efficiency of the washing operation: A collection of sulphur from the gaseous product of a furnace, in which sulphur dioxide was reduced by coke, yielded a product which, although containing 98.8% S, was dark-colored and hence of inferior marketability. The inclusion of the washer in the same installation resulted in raising the sulphur content of the product to better than 99.5%, and the color of the product was substantially identical with that of present day commercial grades of sulphur or brimstone.

From the top of the washer the gases are conducted to the sulphur condenser.

It will be seen from the foregoing description that the condensation of sulphur vapor (together with the collection of sulphur in the form of mist or droplets) in accordance with the preferred form of our invention is characterized by rapid cooling of the gas containing the sulphur to a temperature below about 150° C., and bringing the gas in contact with liquid sulphur at a temperature such that the sulphur particles coalesce to a collectible form of liquid sulphur of low viscosity.

The sulphur condenser of the invention is adapted for the condensation of sulphur vapor and for the collection of mechanically entrained particles of sulphur contained in a wide range of concentrations in gaseous products from various operations, such, for example, as from the reduction of sulphur dioxide by hot carbonaceous material, either directly or incidentally in pyritic roasting or smelting operations in closed top furnaces, from the distillation of pyrite or purification residues from gas works, etc. In actual practice, we have used the condenser with distinct success in the complete process of recovering elemental sulphur from gases containing sulphur dioxide, as described in our copending application, Serial No. 602,236, filed March 31, 1932 (Patent No. 1,972,883).

We claim:

1. Apparatus for recovering elemental sulphur from sulphur-bearing gases comprising a chamber of good heat conducting material provided with a gas inlet and a gas outlet, one or more baffles disposed within the chamber between the inlet and outlet and so arranged as to provide during normal operation of the condenser one or more bodies of molten sulphur through which the gas stream must pass, and a heat dissipating liquid thermally associated with the walls of said chamber and with one or more of the baffles and having a boiling point between about 115° C. and 150° C.

2. Apparatus for recovering elemental sulphur from sulphur-bearing gases comprising a chamber having a gas inlet at one end and a gas outlet at the opposite end, baffles within the chamber for imparting a tortuous path to the gas stream in its passage therethrough and for providing during normal operation of the condenser one or more bodies of molten sulphur through which the gas stream must pass, and a heat dissipating liquid thermally associated with the walls of said chamber and with said baffles and having a boiling point between 115° and 150° C.

3. Apparatus for recovering elemental sulphur from sulphur-bearing gases comprising a chamber having a gas inlet and a gas outlet, means within said chamber for causing the gas stream in its passage therethrough to bubble through one or more bodies of molten sulphur, and a liquid heat dissipating medium thermally associated with said chamber and adapted to rapidly cool the gas stream entering the chamber through the temperature range in which molten sulphur is viscous to a temperature between 115° and 150° C.

4. Apparatus for recovering elemental sulphur from sulphur-bearing gases comprising a liquid sulphur reservoir having a gas inlet, a container of good heat insulating material packed with inert material communicating with the liquid sulphur reservoir and provided with a gas outlet, a chamber of good heat conducting material provided with a gas outlet and with a gas inlet communicating with the gas outlet of the packed container, and one or more baffles disposed within the chamber between the inlet and outlet and so arranged as to provide during normal operation of the condenser one or more bodies of molten sulphur through which the gas stream must pass.

5. Apparatus for recovering elemental sulphur from sulphur-bearing gases comprising a container of good heat insulating material having a compartment forming a liquid sulphur reservoir and a communicating compartment packed with inert material and provided with a gas inlet communicating with the liquid sulphur reservoir and a gas outlet communicating with the interior of the packed compartment, a chamber of good heat conducting material provided with a gas outlet and with a gas inlet communicating with the gas outlet of the packed compartment, and one or more baffles disposed within the chamber between the inlet and outlet and so arranged as to provide during normal operation of the condenser one or more bodies of molten sulphur through which the gas stream must pass.

6. Apparatus for recovering elemental sulphur from sulphur-bearing gases comprising a packed tower of good heat insulating material having a liquid sulphur reservoir in its lower portion, a gas inlet communicating with the interior of the liquid sulphur reservoir, a gas outlet communicating with the interior of the upper portion of the tower, a chamber of good heat conducting material provided with a gas outlet and with a gas inlet communicating with the gas outlet of the packed tower, and one or more baffles disposed within the chamber between the inlet and outlet and so arranged as to provide during normal operation of the condenser one or more bodies of molten sulphur through which the gas stream must pass.

7. Apparatus for recovering elemental sulphur from sulphur-bearing gases comprising a packed tower of good heat insulating material having a liquid sulphur reservoir in its lower portion, a gas inlet communicating with the interior of the liquid sulphur reservoir, a gas outlet communicating with the interior of the upper portion of the tower, a chamber of good heat conducting material provided with a gas outlet and with a gas inlet communicating with the gas outlet of the packed tower, one or more baffles disposed within the chamber between the inlet and outlet and so arranged as to provide during normal operation of the condenser one or more bodies of molten sulphur through which the gas stream must pass, and heat dissipating means associated with the walls of said chamber.

8. Apparatus for recovering elemental sulphur from sulphur-bearing gases comprising a packed tower of good heat insulating material having a liquid sulphur reservoir in its lower portion, a gas inlet communicating with the interior of the liquid sulphur reservoir, a gas outlet communicating with the interior of the upper portion of the tower, a chamber of good heat conducting material provided with a gas outlet and with a gas inlet communicating with the gas outlet of the packed tower, a baffle extending between the side walls within the chamber between the gas inlet and the gas outlet and from the top wall to a point adjacent to but spaced from the bottom wall, and a sulphur outlet communicating with the interior of the chamber on the side of the baffle opposite to the side on which the gas inlet is disposed and having its discharge opening disposed at a point above the lower end of the baffle.

9. Apparatus for recovering elemental sulphur from sulphur-bearing gases comprising a packed tower of good heat insulating material having a liquid sulphur reservoir in its lower portion, a gas inlet communicating with the interior of the liquid sulphur reservoir, a gas outlet communicating with the interior of the upper portion of the tower, a chamber of good heat conducting material provided with a gas outlet and with a gas inlet communicating with the gas outlet of the packed tower, a baffle extending between the side walls within the chamber between the gas inlet and the gas outlet and from the top wall to a point adjacent to but spaced from the bottom wall, a sulphur outlet communicating with the interior of the chamber on the side of the baffle opposite to the side on which the gas inlet is disposed and having its discharge opening disposed at a point above the lower end of the baffle, and heat dissipating means associated with the walls of said chamber.

10. Apparatus for recovering elemental sulphur from sulphur-bearing gases comprising a packed tower of good heat insulating material having a liquid sulphur reservoir in its lower portion, a gas inlet communicating with the interior of the liquid sulphur reservoir, a gas outlet communicating with the interior of the upper portion of the tower, a chamber of good heat conducting material provided with a gas outlet and with a gas inlet communicating with the gas outlet of the packed tower, two or more baffles extending downwardly within the chamber between the gas inlet and the gas outlet from the top wall to a point adjacent to but spaced from the bottom wall and between the side walls, one or more baffles extending upwardly between adjacent downwardly extending baffles and between the side walls of the chamber from the bottom wall to points above the lower ends of the downwardly extending baffles, and a sulphur outlet communicating with the interior of the chamber on the side of the baffles opposite to the side on which the gas inlet is disposed and having its discharge opening disposed above the lower ends of the downwardly extending baffles.

GEORGE HOMER GLEASON.
ALFRED C. LOONAM.